(12) United States Patent
Okada et al.

(10) Patent No.: US 7,321,685 B2
(45) Date of Patent: Jan. 22, 2008

(54) IMAGE PROCESSING DEVICE, IMAGE PROCESSING METHOD, AND IMAGE CAPTURING DEVICE

(75) Inventors: Miyuki Okada, Kanagawa (JP); Hirofumi Hayakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 10/834,751

(22) Filed: Apr. 28, 2004

(65) Prior Publication Data

US 2004/0218813 A1    Nov. 4, 2004

(30) Foreign Application Priority Data

Apr. 30, 2003    (JP)    ............................ P2003-124930

(51) Int. Cl.
*G06K 9/00*    (2006.01)
(52) U.S. Cl. .................................................. 382/167
(58) Field of Classification Search ................ 382/162, 382/167; 358/518–520; 348/223.1, 242, 348/335
See application file for complete search history.

(56) References Cited

U.S. PATENT DOCUMENTS

| 5,241,372 A  * | 8/1993 | Ohba ......................... 348/578 |
| 6,747,702 B1 * | 6/2004 | Harrigan ..................... 348/335 |
| 6,788,813 B2 * | 9/2004 | Cooper ....................... 382/167 |

* cited by examiner

*Primary Examiner*—Jose L. Couso
(74) *Attorney, Agent, or Firm*—Frommer Lawrence & Haug LLP; William S. Frommer

(57) ABSTRACT

The present invention provides an image processing device for correcting aberrations caused by a capturing lens for an image signal to which light passing through the capturing lens is electrically converted. The image processing device includes a correction vector calculation unit for calculating a correction vector in accordance with coordinates of each pixel of each color component contained in the image signal on the basis of at least data on chromatic aberration and distortion aberration caused by the capturing lens; a conversion ratio calculation unit for receiving at least the image signal, capturing conditions, and the correction vector, and for calculating a conversion ratio for scaling the color component in accordance with the coordinates of the pixel; and a resolution conversion unit for scaling the color component in accordance with the coordinates of the pixel on the basis of the conversion ratio.

16 Claims, 8 Drawing Sheets

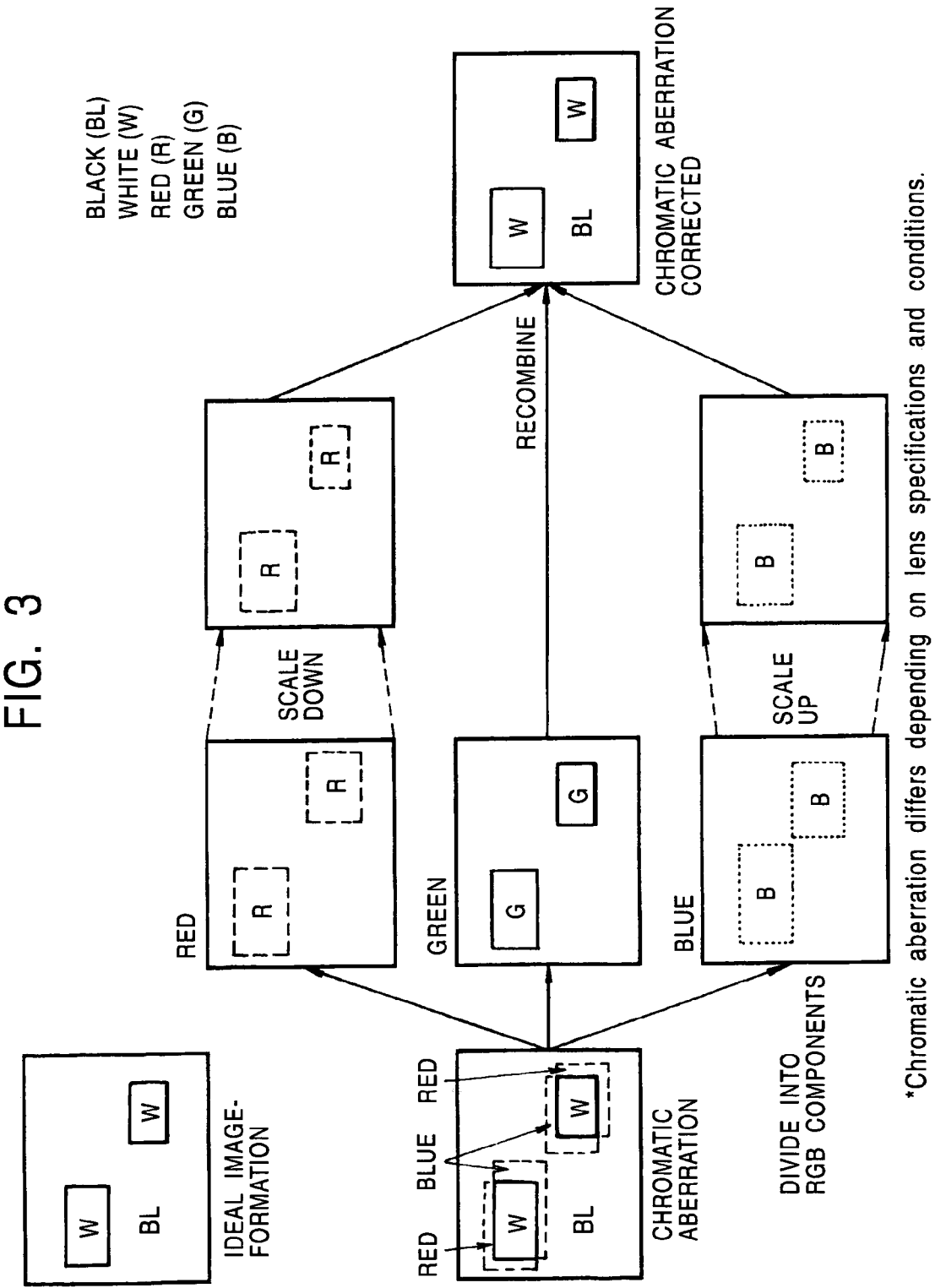

CORRECTION SYSTEM: SHIFT

CORRECTION SYSTEM: ACTIVE IMAGE AREA

CORRECTION SYSTEM: FRAME MEMORY

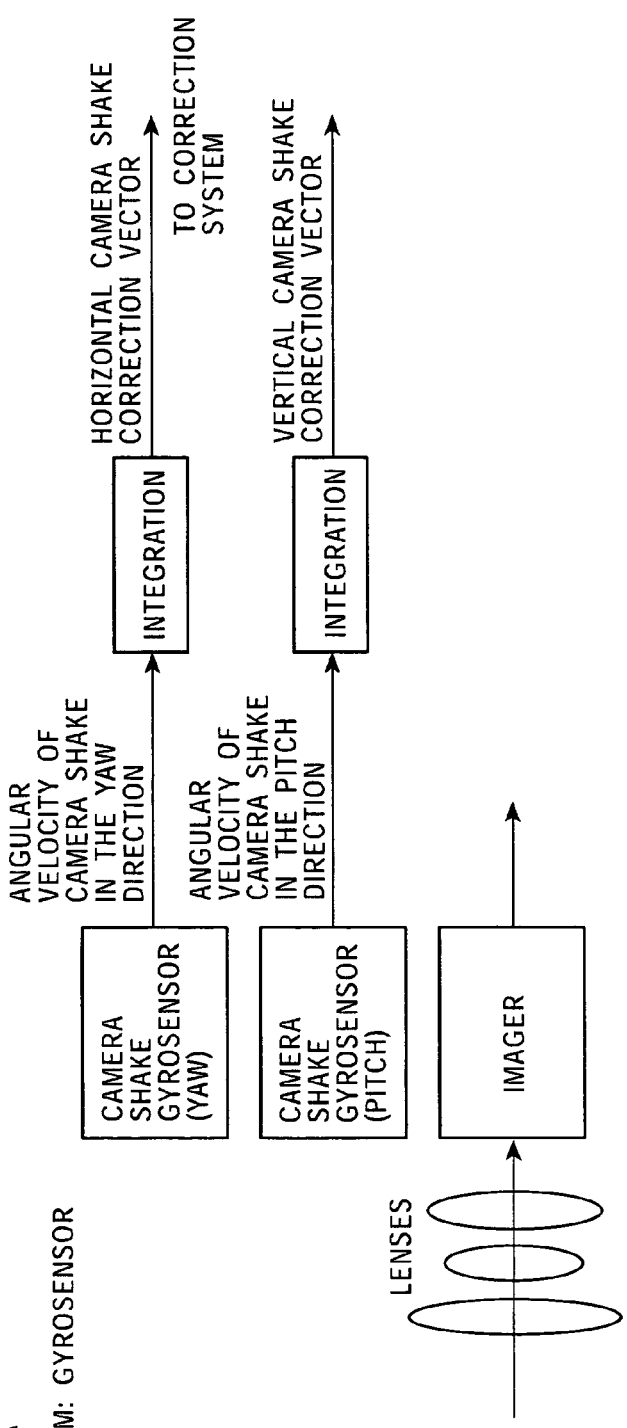
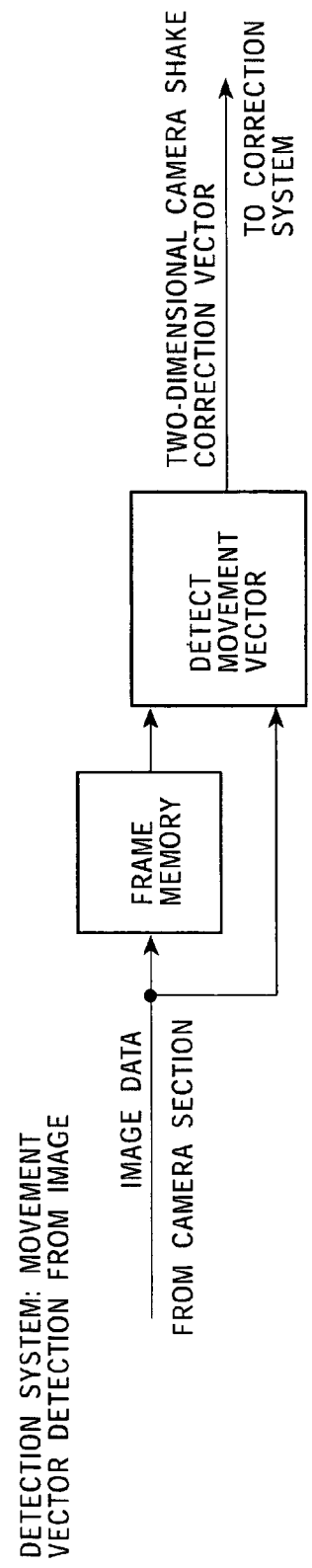
FIG. 5A
DETECTION SYSTEM: GYROSENSOR
FIG. 5B
DETECTION SYSTEM: MOVEMENT VECTOR DETECTION FROM IMAGE

LENS DISTORTION ABERRATION: NONE

LENS DISTORTION ABERRATION: EXIST (BARRELING)

IMAGE PROCESSING DEVICE, IMAGE PROCESSING METHOD, AND IMAGE CAPTURING DEVICE

BACKGROUND OF THE INVENTION

1. Field of the Invention

The present invention relates to image processing devices, image processing methods, and image capturing devices that correct aberrations caused by capturing lenses in images captured with the capturing lenses. In particular, the present invention relates to an image processing device, an image processing method, and an image capturing device capable of simultaneously correcting chromatic aberration and distortion aberration caused by a capturing lens.

2. Description Aberration of the Related Art

Video cameras or digital still cameras have been miniaturized rapidly in recent years, and capturing lenses themselves have also been miniaturized. The miniaturization of the capturing lenses increases the aberrations caused by the lenses and therefore quality degradation of captured images is difficult to be suppressed adequately. Specifically, as shown FIG. 6, since each wavelength of red, green, blue components has a different index of refraction when passing through the lenses, a phenomenon occurs in which an image element for the red component is formed outside and an image element for the blue component is formed inside relative to that for the green component. This phenomenon results in color blurring (color shifting) along edges in the image of a subject, even for a black-and-white subject. Japanese Unexamined Patent Application Publication No. 2000-299874 discloses a technique for correcting the aberrations caused by a capturing lens by signal processing.

Moreover, due to distortion aberration, as shown in FIGS. 7A and 7B, straight lines of an image for a linear subject (see FIG. 7A) are disadvantageously curved. The distortion aberration is classified into two types: barrel and pincushion. FIG. 7B illustrates typical barrel distortion.

Conventional electrical correction of the chromatic aberration or distortion aberration mentioned above individually covers only one of them. In order to correct both aberrations, as shown in FIG. 8, these aberrations may be continuously corrected by two correction processes 81 and 82. This correction, however, requires a plurality of reproducing from image memory and recording to the image memory and therefore takes a long time for the whole processing, including the time required for accessing the image memory. As a result, high-speed processing for the correction is difficult to achieve.

In particular, when correction in the horizontal direction and correction in the vertical direction cannot be performed at the same time, the processing time is further increased and thus high-speed processing is more difficult to achieve. This results in decreased product performance, such as a long time between successive image captures in a digital still camera.

Moreover, a long processing time causes an increase in the overall power consumption, including the process for accessing the image memory. This also results in decreased product performance, such as short battery life.

SUMMARY OF THE INVENTION

The present invention is achieved to solve the problems described above. According to a first aspect, the present invention provides an image processing device for correcting aberrations caused by a capturing lens for an image signal to which light passing through the capturing lens is electrically converted. The image processing device includes a correction vector calculation unit for calculating a correction vector in accordance with coordinates of each pixel of each color component contained in the image signal on the basis of at least data on chromatic aberration and distortion aberration caused by the capturing lens, a conversion ratio calculation unit for receiving at least the image signal, capturing conditions of the capturing lens, and the calculated correction vector, and for calculating a conversion ratio for scaling the color component in accordance with the coordinates of the pixel, and a resolution conversion unit for scaling the color component in accordance with the coordinates of the pixel on the basis of the calculated conversion ratio.

According to a second aspect, the present invention provides an image processing method for correcting aberrations caused by a capturing lens for an image signal to which light passing through the capturing lens is electrically converted. The image processing method includes the following steps: calculating a correction vector in accordance with coordinates of each pixel contained in the image signal on the basis of at least data on chromatic aberration and distortion aberration caused by the capturing lens; receiving at least the image signal, capturing conditions of the capturing lens, and the calculated correction vector, and calculating a conversion ratio for scaling the image signal; and scaling the image signal in accordance with the calculated conversion ratio.

According to a third aspect, the present invention provides an image capturing device including an image capturing element for converting light passing through a capturing lens to an electrical image signal, a correction vector calculation unit for calculating a correction vector in accordance with coordinates of each pixel of each color component contained in the image signal on the basis of at least data on chromatic aberration and distortion aberration caused by the capturing lens, a conversion ratio calculation unit for receiving at least the image signal, capturing conditions of the capturing lens, and the calculated correction vector, and for calculating a conversion ratio for scaling the color component in accordance with the coordinates of the pixel, and a resolution conversion unit for scaling the color component in accordance with the coordinates of the pixel on the basis of the calculated conversion ratio.

The terms lens and capturing lens in the present invention represent a lens group including one or more individual capturing lens elements.

The present invention provides the following advantageous effects. Both distortion aberration and chromatic aberration caused by a lens are simultaneously corrected by the same hardware. Output images and recorded images are of high image quality with reduced distortion aberration and color blurring. Correcting both distortion aberration and chromatic aberration at the same time achieves high-speed processing. This achieves operation at short time intervals between shootings, such as during continuous shootings, and a reduction in power consumption in digital still cameras.

In addition to image data captured by a camera section, the present invention may be advantageously applied to image data reproduced from a recording medium. If such image data has distortion aberration and chromatic aberration present during recording, the image data is reproduced after correction thereof. Image quality of the image data is thus improved. For video cameras and digital still cameras having means for correcting camera shake, distortion aberration and chromatic aberration are accurately corrected by controlling the coordinates of the optical axis in accordance with a vector for correcting camera shake.

BRIEF DESCRIPTION OF THE DRAWINGS

FIG. 3 is a conceptual schematic diagram of correction of chromatic aberration by resolution conversion;

FIGS. 5A and 5B are schematic diagrams of embodiments according to a camera shake sensor;

DESCRIPTION OF THE PREFERRED EMBODIMENTS

Figure 1:
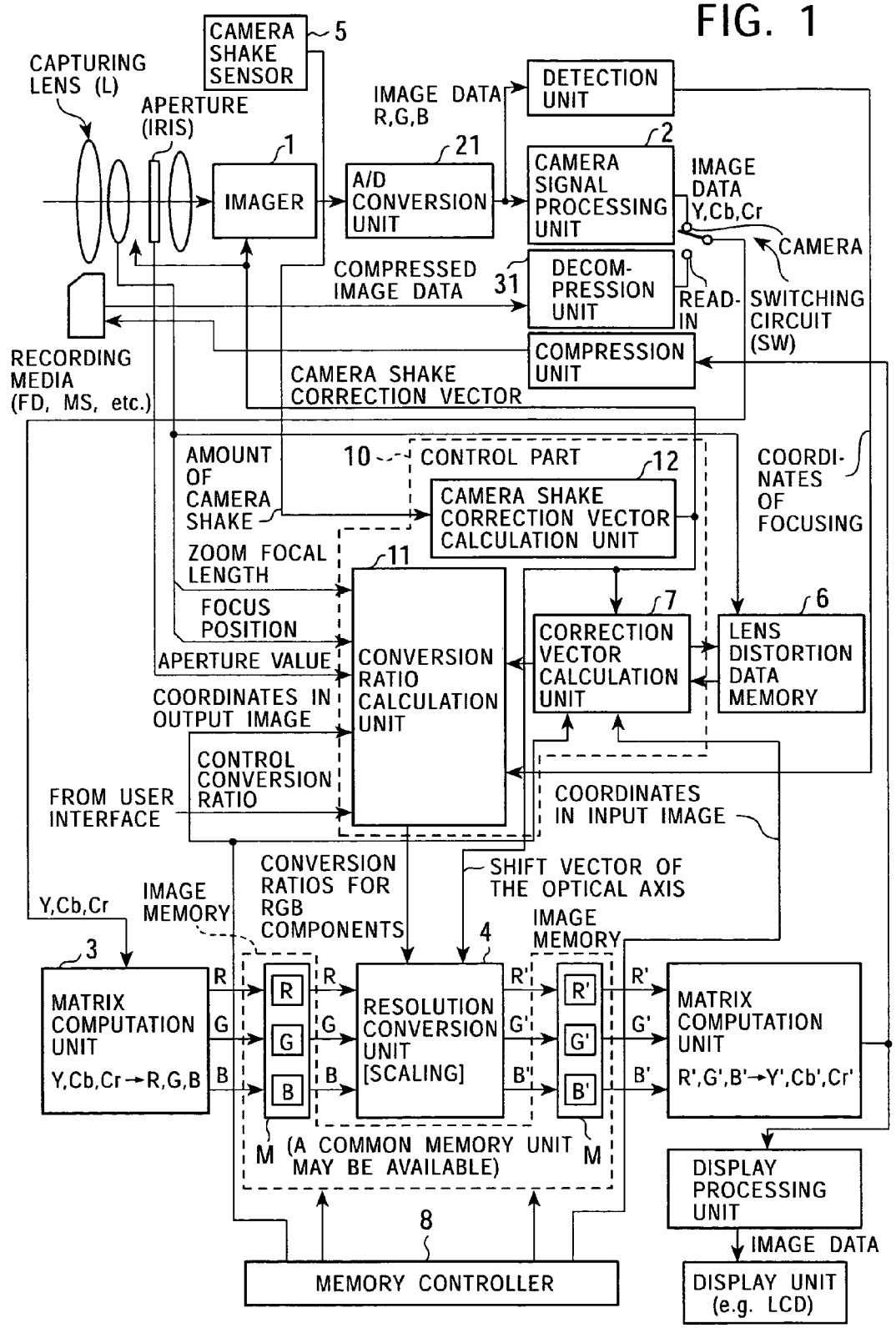
FIG. 1 is a block diagram of an image recording and reproducing apparatus according to an embodiment of the present invention.

Embodiments of the present invention will now be described with reference to the drawings. In the embodiments, an image processing device of the present invention is applied to an image recording and reproducing apparatus. FIG. 1 is a block diagram of the image recording and reproducing apparatus according to an embodiment of the present invention.

The image recording and reproducing apparatus is, for example, a digital still camera. The image recording and reproducing apparatus has an imager 1 (a CCD, a CMOS sensor, or the like) for converting light passing through a capturing lens L to an electrical image signal, a camera signal processing unit 2 for processing the image signal, a matrix computation unit 3 for transforming or inversely transforming the signal output from the camera signal processing unit 2 into signals including components for at least three primary colors, a resolution conversion unit 4 for scaling each color component of the primary colors in the image signal of an image, a camera shake sensor 5 for detecting the amount of correction of camera shake, lens distortion data memory 6 for holding data on distortion caused by the lens, a correction vector calculation unit 7 for calculating a correction vector in accordance with the data on distortion caused by the lens from the lens distortion data memory 6 and coordinates of pixels in the image, and a control part 10 for controlling a conversion ratio for the scaling in the resolution conversion unit 4 and the coordinates of the optical axis in accordance with a driving state including zoom and focus positions of the capturing lens L, an aperture value, the amount of correction of camera shake from the camera shake sensor 5, the image height defined by the lens, the correction vector from the correction vector calculation unit 7, and the coordinates of the pixels.

Major functions of the image recording and reproducing apparatus are as follows: a "camera mode" for capturing images; a "reproducing mode" for reproducing images; a "matrix computation" for transforming a color space for image signals; a "resolution conversion" for achieving correction of aberrations caused by the capturing lens; and a "camera shake correction control" for correcting camera shake occurring during image capturing. Processing of each function will now be described below.

"Camera Mode"

Light signals from a subject are supplied to the imager 1 through the capturing lens L, which includes several individual lens elements, and are converted by the imager 1 to electrical signals. The electrical signals are supplied to an A/D conversion unit 21 and are converted by the A/D conversion unit 21 to image data consisting of digital signals. The image data is supplied to the camera signal processing unit 2 and is subjected to processing by the camera signal processing unit 2. When the image data output from the A/D conversion unit 21 consists of R, G, and B components, for example, the image data is transformed into image data consisting of Y, Cb, and Cr components by the camera signal processing unit 2. The image data transformed by the camera signal processing unit 2 is supplied to the matrix computation unit 3 via a switching circuit SW for switching between the camera mode and the reproducing mode.

"Reproducing Mode"

The image recording and reproducing apparatus according to the embodiment is capable of handling both input signals from a camera section and reproduced signals. Specifically, compressed image data reproduced from a recording medium, such as a floppy disk (FD) or a memory stick™ (MS), is decompressed by a decompression unit 31 and the decompressed image data is supplied to the matrix computation unit 3 via the switching circuit SW for switching between the camera mode and the reproducing mode.

"Matrix Computation"

The correction of aberrations is preferably performed when the image data consists of R, G, and B components. Therefore, if input signals consist of Y, Cb, and Cr components, the input signals first need to be transformed by the matrix computation unit 3.

In FIG. 1, image data consisting of Y, Cb, and Cr components is transformed into R, G, and B components by the matrix computation unit 3 and the transformed image data is recorded into image memory M. By contrast, the image data consisting of R, G, and B components reproduced from the image memory M is inversely transformed into Y, Cb, and Cr components by the matrix computation unit 3 and is subjected to processing for recording or reproducing.

Figure 2:
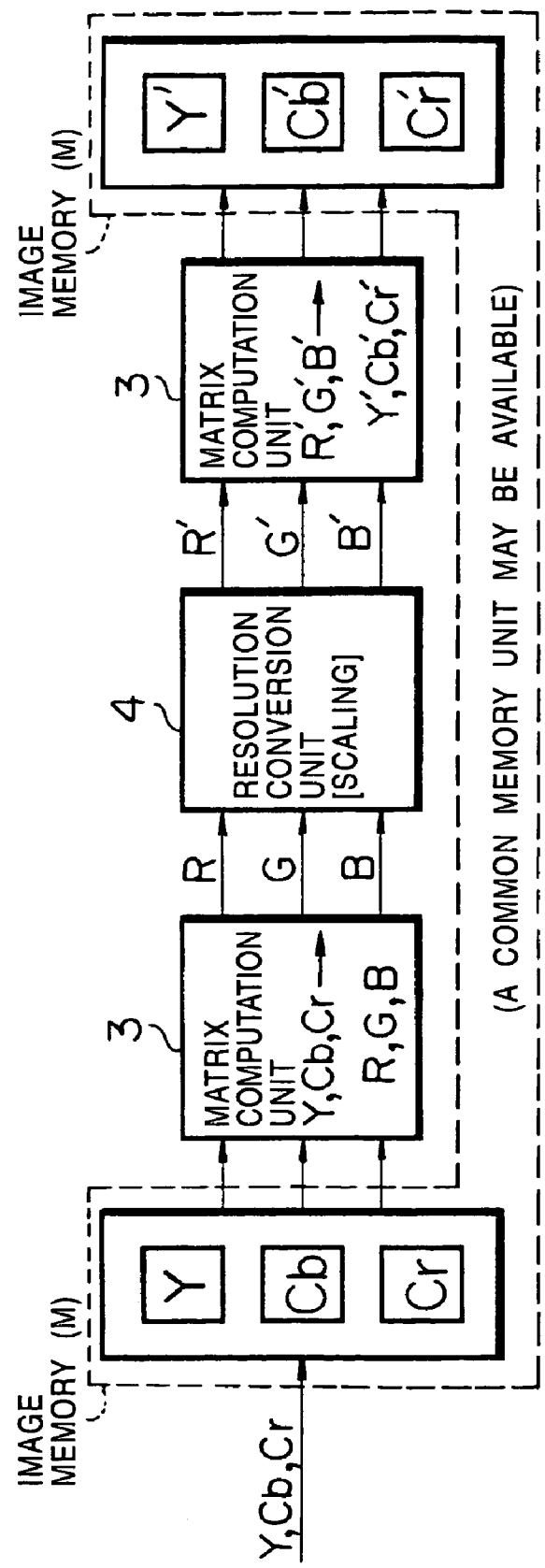
FIG. 2 is a block diagram of a matrix computation.

FIG. 2 shows when the image data consisting of Y, Cb, and Cr components is recorded into the image memory M. In this case, processing by the matrix computation unit 3 is required before and after processing by the resolution conversion unit 4. At the matrix computation unit 3, transformation between Y, Cb, and Cr components and R, G, and B components is carried out.

"Resolution Conversion (Scaling)"

In FIG. 1, individual image data elements for R, G, and B components recorded in the image memory M are converted by the resolution conversion unit 4. For example, R and B signals are converted relative to a G signal, i.e., the R signal is scaled down and the B signal is scaled up in accordance with the properties of the capturing lens L. When aberrations other than chromatic differences of magnification occur compositely, the scaling up/down may be changed. Aberration constituents caused by the lens are corrected by the resolution conversion unit 4 and then the corrected image data is recorded into the image memory M again.

The conversion ratio for the scaling by the resolution conversion unit 4 with respect to correction of the chromatic aberration is controlled by the control part based on the following four values: (1) the zoom focal length; (2) the focus position; (3) the aperture value (f number); and (4) the distance between the coordinates of the image signal subjected to the resolution conversion processing and the coordinates of the optical axis, the distance corresponding to the image height and being supplied from a memory controller 8. Items (1) to (3) are provided from the lens system in the camera mode.

An alternative to item (4) may be an arrangement in which detecting processing for auto focusing is performed from video signals for the camera signal processing and the conversion ratio for the scaling relative to focusing coordinates in the image (the coordinates of an in-focus subject), as representative points of the entire image, is calculated.

These capturing conditions may be detected at capturing time of the image data and stored in the image memory M when the image data is recorded. The stored capturing conditions may be retrieved when the image data is reproduced.

With respect to correction of distortion aberration in the camera mode, the coordinates of pixels in the original image are calculated from lens distortion data at several representative points in the image supplied from the lens distortion data memory 6 and the coordinates of pixels subjected to the resolution conversion processing (the coordinates in the output image) supplied from the memory controller 8. The results are supplied to a conversion ratio calculation unit 11.

In this unit, the coordinates of several pixels of the original image required for the resolution conversion and the conversion ratio are determined. Based on this resulting conversion ratio for the correction of distortion aberration and the calculated conversion ratio for the chromatic aberration described above, the final resolution conversion ratio is calculated for each pixel of the R, G, and B components so that the resolution conversion unit 4 simultaneously corrects both the distortion aberration and the chromatic aberration. This is the characteristic feature of the embodiment.

In the reproducing mode, the user can minimize the chromatic aberration and/or the distortion aberration while observing the output image. In this case, the conversion ratio is controlled by a user interface.

FIG. 3 shows the concept of correction of chromatic aberration by the resolution conversion. In an image having chromatic aberration, generally, a red component is shifted toward the periphery and a blue component is shifted toward the inside, even for a black-and-white subject. This image data is divided into image data elements for R, G, and B components, and the R signal is scaled down and the B signal is scaled up relative to the G signal. Image data recombined from these signals have corrected aberrations and reduced color blurring, thus achieving high-resolution image quality.

In the embodiment, based on the lens distortion data at the several representative points supplied from the lens distortion data memory 6 and the coordinates of the pixels subjected to the resolution conversion processing (the coordinates in the output image) supplied from the memory controller 8, the coordinates of the pixels in the original image are calculated. The results are supplied to the conversion ratio calculation unit 11 and the conversion ratio for correction of distortion aberration is determined. By multiplying this resulting conversion ratio for the correction of distortion aberration by the determined conversion ratio for the chromatic aberration described above, the final resolution conversion ratio is calculated for each pixel of the R, G, and B components. This final resolution conversion ratio allows the resolution conversion unit 4 to simultaneously correct both the distortion aberration and the chromatic aberration.

"Camera Shake Correction"

If camera shake correction means for correcting camera shake occurring at capturing time is provided after the capturing lens L, a camera shake correction vector is calculated by a camera shake correction vector calculation unit 12 of the control part 10 or the like based on the amount of the camera shake supplied from the camera shake sensor 5 and the calculated camera shake correction vector is supplied to the correction vector calculation unit 7. When the positive and negative signs of this camera shake correction vector are reversed two-dimensionally, the camera shake correction vector corresponds to a shift vector at the coordinates of the optical axis of the lens in the image data. Therefore, the coordinates of the optical axis of the lens are supplied from the control part 10 to the resolution conversion unit 4 so that the scaling factor is determined relative to the coordinates of the optical axis of the lens.

The coordinates of the optical axis of the lens are supplied to a section for calculating coordinates for correction of distortion aberration. The coordinates in the input image are shifted by the vector so that the optimum correction of distortion aberration relative to the optical axis is achieved on every occasion.

Figure 4A:
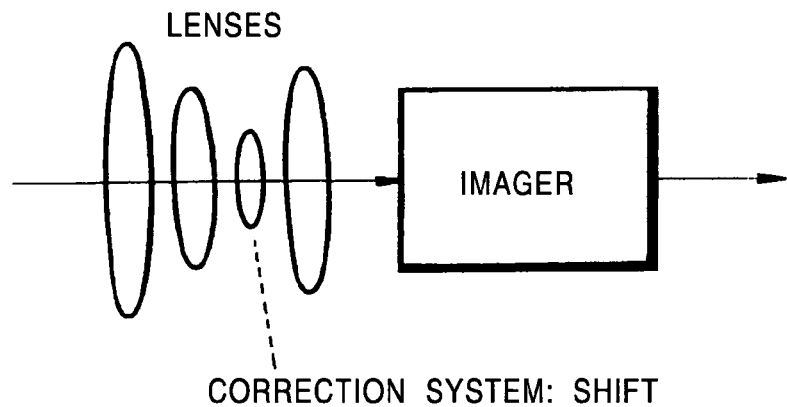
FIGS. 4A to 4C are schematic diagrams of embodiments according to camera shake correction means.
Figure 4B:
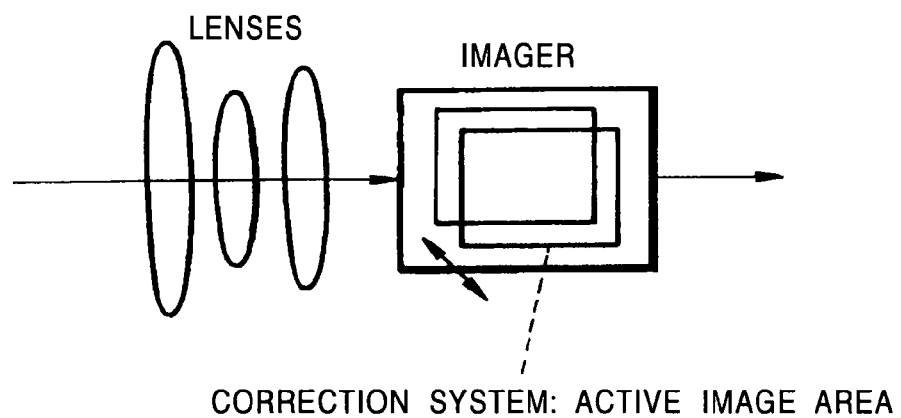
Figure 4C:
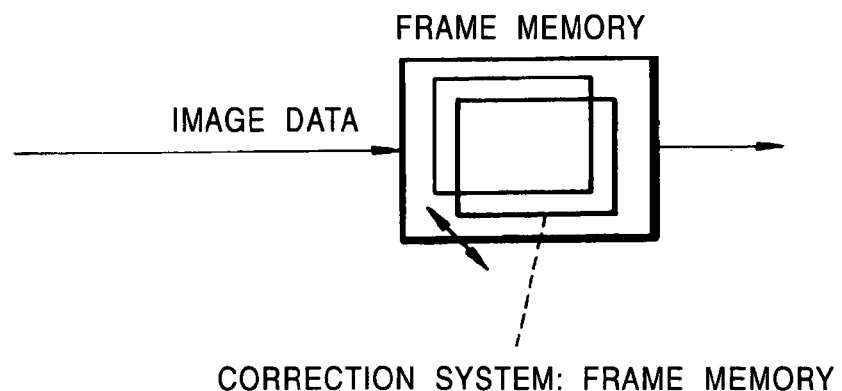
Figure 6:
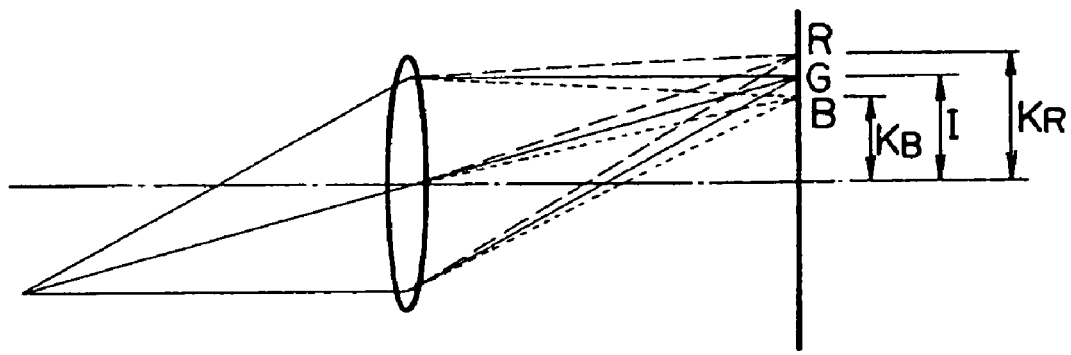
FIG. 6 is a schematic diagram of color shifting caused by a lens.
Figure 7A:
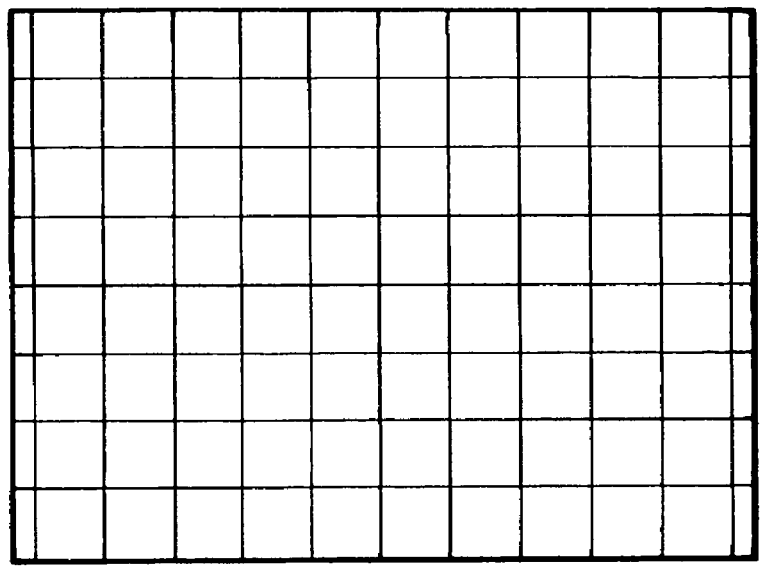
FIGS. 7A and 7B are schematic diagrams for explanation of distortion aberration caused by a lens.
Figure 7B:
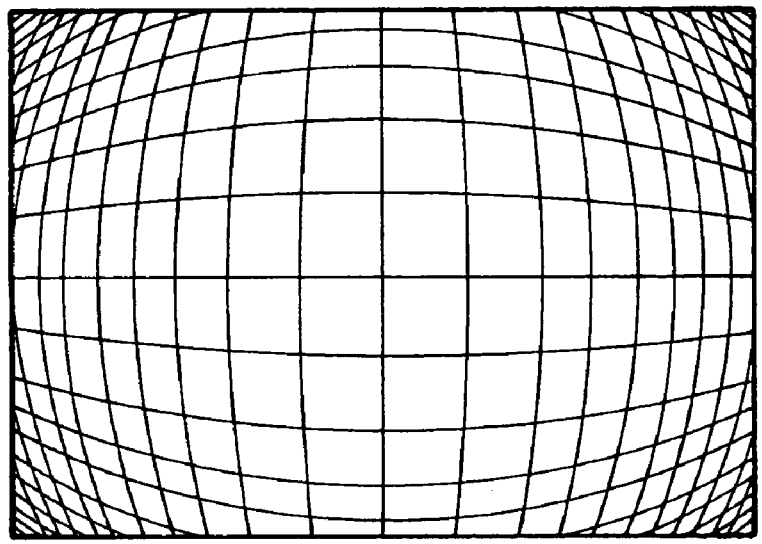
Figure 8:
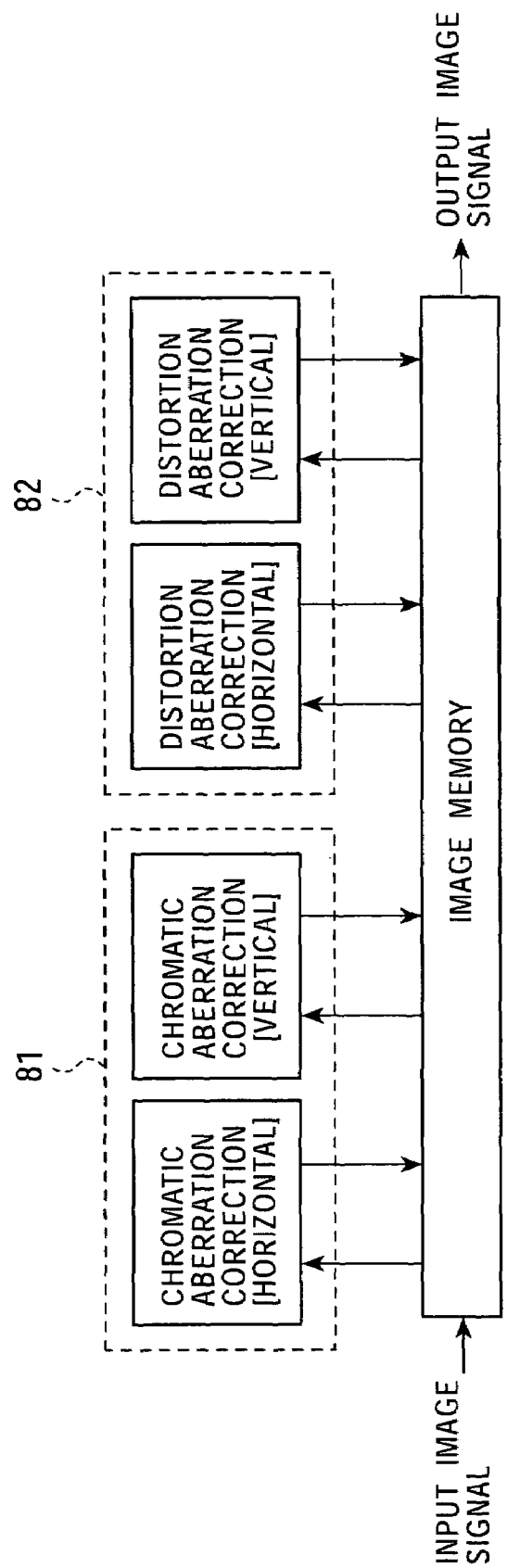
FIG. 8 is a block diagram of a conventional aberration correction.

The camera shake correction means in this example is limited to that provided after the lens. Examples include the following: a case where means for shifting the optical axis is provided in a lens group (see FIG. 4A); a case where an address for reproducing the image is shifted (see FIG. 4B); and a case where an address in the image memory is shifted (see FIG. 4C).

By contrast, if means for correction, such as a prism, is provided before the lens, the coordinates of the optical axis are not required to be dynamically controlled. This is because the coordinates of the optical axis in the image data are fixed.

Examples of the camera shake sensor include a gyrosensor (e.g. an angular velocity sensor, as shown in FIG. 5A), and a detection system retrieving a movement vector from the image (see FIG. 5B). The detected value by the camera shake sensor may be stored in the image memory M together with the image data so as to be retrieved concurrently with the reproducing of the image data.

In this way, based on the data on aberrations caused by the capturing lens L in accordance with the capturing conditions, the conversion ratio in accordance with each color component is calculated. Image data elements for color components are scaled up or down by the resulting conversion ratios by the resolution conversion unit 4 so that correction of both the aberrations caused by the capturing lens L and the camera shake is achieved by the resolution conversion unit 4. As a result, high-speed correction of the image data and corrected image quality are achieved.

While the embodiments have been described with reference to the digital still camera functioning as the image recording and reproducing apparatus, the present invention is not limited to the disclosed embodiments. For example, apparatuses capable of handling moving images, such as video-phone apparatuses including an apparatus using a personal computer, camera phones, or personal digital assistants (PDAs) may be used. In particular, since the image processing device and the image processing method of the present invention are capable of correcting aberrations caused by a lens in a short time, application to an apparatus capable of handling moving images is effective.

The image processing method according to the present invention can be realized as processing of a program running in a personal computer. In this case, data on the capturing conditions, chromatic aberration and distortion aberration caused by the capturing lens with respect to the image data captured in advance is captured by the program, and the resolution conversion described above is performed. Therefore, the aberrations caused by the lens at capturing time for the captured image data can be corrected. The capturing conditions and the data on the aberrations caused by the capturing lens may be captured separately from the image data, or may be included in the image data.

While the resolution conversion handles three primary colors consisting of R, G, and B components in the embodiments, other colors (e.g. five colors consisting of cyan (C)

and magenta (M) in addition to RGB) are applicable. Increasing the number of colors achieves high-precision correction of image quality.

The data on the aberrations caused by the lens may be stored in the lens distortion data memory in advance, may be captured externally, or may be rewritable in order to handle a lens change.

The present application contains subject matter related to Japanese Patent Application No. JP 2003-124930, filed in the JPO on Mar. 30, 2003, the entire contents of which being incorporated herein by reference.

What is claimed is:

1. An image processing device for correcting aberrations caused by a capturing lens for an image signal to which light passing through the capturing lens is electrically converted, the image processing device comprising:

correction vector calculation means for calculating a correction vector in accordance with coordinates of each pixel of each color component contained in the image signal on the basis of at least data on chromatic aberration and distortion aberration caused by the capturing lens;

conversion ratio calculation means for receiving at least the image signal, capturing conditions of the capturing lens, and the calculated correction vector, and for calculating a conversion ratio for scaling the color component in accordance with the coordinates of the pixel; and resolution conversion means for scaling the color component in accordance with the coordinates of the pixel on the basis of the calculated conversion ratio.

2. The image processing device according to claim 1, wherein the capturing conditions received by the conversion ratio calculation means comprise a driving state including zoom and focus positions of the capturing lens, an aperture value, and the amount of correction of camera shake.

3. The image processing device according to claim 1, further comprising:

signal transformation means for performing transformation between an output image signal from the resolution conversion means and a transformed image signal to be output to an exterior or to be recorded;

means for outputting the transformed image signal or for transmitting an external image signal to the signal transformation means; and means for recording the transformed image signal on a recording medium or for reproducing the recorded image signal recorded on the recording medium.

4. The image processing device according to claim 3, wherein the means for recording or reproducing the image signal further records capturing information on a driving state of the capturing lens, an aperture value, the amount of correction of camera shake, and an image height defined by the capturing lens, or correcting information on lens correction calculated from the capturing information, together with the recording of the image signal on the recording medium.

5. The image processing device according to claim 1, further comprising user interface means for freely setting the conversion ratio to be used in the resolution conversion means and the coordinates of the optical axis.

6. The image processing device according to claim 4, wherein the conversion ratio to be used in the resolution conversion means and the coordinates of the optical axis are controlled in accordance with the capturing information or the correcting information reproduced by the means for recording or reproducing the image signal.

7. An image processing method for correcting aberrations caused by a capturing lens for an image signal to which light passing through the capturing lens is electrically converted, the image processing method comprising the steps for:

calculating a correction vector in accordance with coordinates of each pixel contained in the image signal on the basis of at least data on chromatic aberration and distortion aberration caused by the capturing lens;

receiving at least the image signal, capturing conditions of the capturing lens, and the calculated correction vector, and calculating a conversion ratio for scaling the image signal; and scaling the image signal in accordance with the calculated conversion ratio.

8. The image processing method according to claim 7, wherein the capturing conditions of the capturing lens comprise a driving state including zoom and focus positions of the capturing lens, an aperture value, and the amount of correction of camera shake.

9. The image processing method according to claim 7, further comprising the step for:

transforming an output image signal that is scaled in accordance with the conversion ratio into a transformed image signal to be output to an exterior or to be recorded.

10. The image processing method according to claim 7, further comprising the step for:

recording on a recording medium the image signal and capturing information on a driving state of the capturing lens, an aperture value, and the amount of correction of camera shake, and an image height defined by the capturing lens, or correcting information on lens correction calculated from the capturing information.

11. The image processing method according to claim 7, further comprising the step for:

correcting the conversion ratio by instructions from a user when the conversion ratio for scaling the image signal is calculated.

12. An image capturing device comprising:

an image capturing element for converting light passing through a capturing lens to an electrical image signal;

correction vector calculation means for calculating a correction vector in accordance with coordinates of each pixel of each color component contained in the image signal on the basis of at least data on chromatic aberration and distortion aberration caused by the capturing lens;

conversion ratio calculation means for receiving at least the image signal, capturing conditions of the capturing lens, and the calculated correction vector, and for calculating a conversion ratio for scaling the color component in accordance with the coordinates of the pixel; and resolution conversion means for scaling the color component in accordance with the coordinates of the pixel on the basis of the calculated conversion ratio.

13. The image capturing device according to claim 12, wherein the capturing conditions received by the conversion ratio calculation means comprise a driving state including zoom and focus positions of the capturing lens, an aperture value, and the amount of correction of camera shake.

14. The image capturing device according to claim 12, further comprising user interface means for freely setting the conversion ratio to be used in the resolution conversion means and the coordinates of the optical axis.

15. An image processing device for correcting aberrations caused by a capturing lens for an image signal to which light passing through the capturing lens is electrically converted, the image processing device comprising:

correction vector calculation block configured to calculate a correction vector in accordance with coordinates of each pixel of each color component contained in the image signal on the basis of at least data on chromatic aberration and distortion aberration caused by the capturing lens;

conversion ratio calculation block configured to receive at least the image signal, capturing conditions of the capturing lens, and the calculated correction vector, and to calculate a conversion ratio for scaling the color component in accordance with the coordinates of the pixel; and resolution conversion block configured to scale the color component in accordance with the coordinates of the pixel on the basis of the calculated conversion ratio.

16. An image capturing device comprising:

an image capturing element configured to convert light passing through a capturing lens to an electrical image signal;

correction vector calculation block configured to calculate a correction vector in accordance with coordinates of each pixel of each color component contained in the image signal on the basis of at least data on chromatic aberration and distortion aberration caused by the capturing lens;

conversion ratio calculation block configured to receive at least the image signal, capturing conditions of the capturing lens, and the calculated correction vector, and to calculate a conversion ratio for scaling the color component in accordance with the coordinates of the pixel; and resolution conversion block configured to scale the color component in accordance with the coordinates of the pixel on the basis of the calculated conversion ratio.

* * * * *